United States Patent [19]
Ratnik et al.

[11] Patent Number: 5,547,164
[45] Date of Patent: Aug. 20, 1996

[54] MOTORIZED WATER HYDRANT WITH MANUAL OVERRIDE

[75] Inventors: H. Ronald Ratnik; Otmar Ulbing, both of Pittsford, N.Y.

[73] Assignee: Ratnik Industries, Inc., Pittsford, N.Y.

[21] Appl. No.: 364,959

[22] Filed: Dec. 28, 1994

[51] Int. Cl.$^6$ ................................................ F16K 31/05
[52] U.S. Cl. .............................. 251/129.03; 251/129.11
[58] Field of Search ........................ 251/129.03, 129.11; 74/424.8 VA

[56] References Cited

U.S. PATENT DOCUMENTS

| | | | |
|---|---|---|---|
| 3,204,484 | 9/1965 | Gustafson | 251/129.03 |
| 3,417,637 | 12/1968 | Vanderbilt | 251/129.03 |
| 3,687,415 | 8/1972 | Turkot | 251/129.03 |
| 4,989,830 | 2/1991 | Ratnik | 251/129.11 |

*Primary Examiner*—Edward K. Look
*Assistant Examiner*—Christopher Verdier
*Attorney, Agent, or Firm*—Warren W. Kurz, Esq.

[57] ABSTRACT

A motorized water hydrant of the type operated by a bi-directional electric motor assembly is provided with a mechanism for operating the hydrant in the event of electric power failure. A motor drive shaft rigidly coupled to a valve stem on the hydrant has first and second portions of circular and hexagonal cross-section, respectively. A handle member having a hexagonal aperture therein is slidably mounted on the drive shaft for movement between a first position in which the first portion of the shaft may rotate freely within the handle aperture, and a second position in which the second portion of the shaft mates with the handle aperture and prevents the motor drive shaft from rotating in the motor assembly. The motor assembly is rotatably mounted on the hydrant housing for movement about the valve stem axis. When the handle is moved to its second position and the motor assembly is manually rotated about the valve stem axis, the hydrant operates manually.

14 Claims, 5 Drawing Sheets

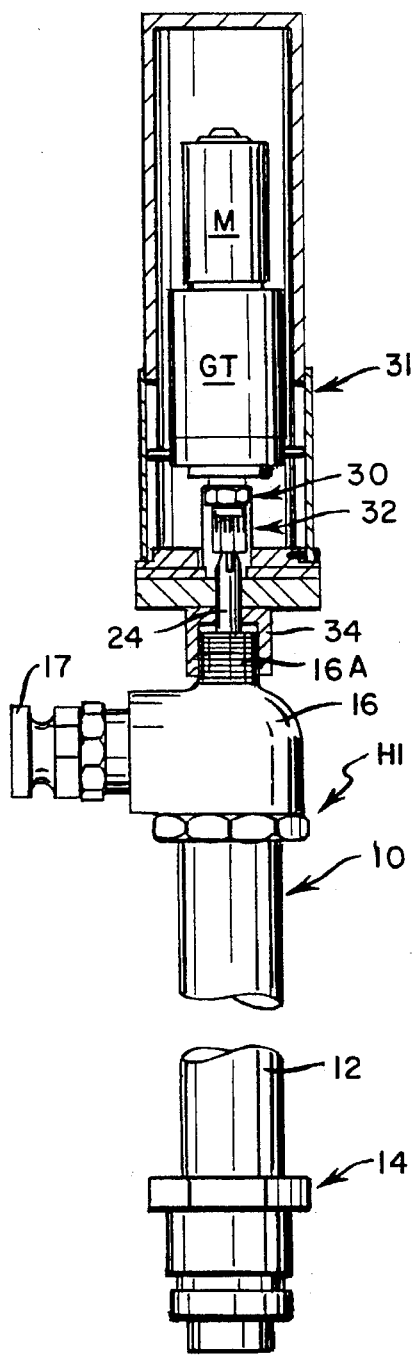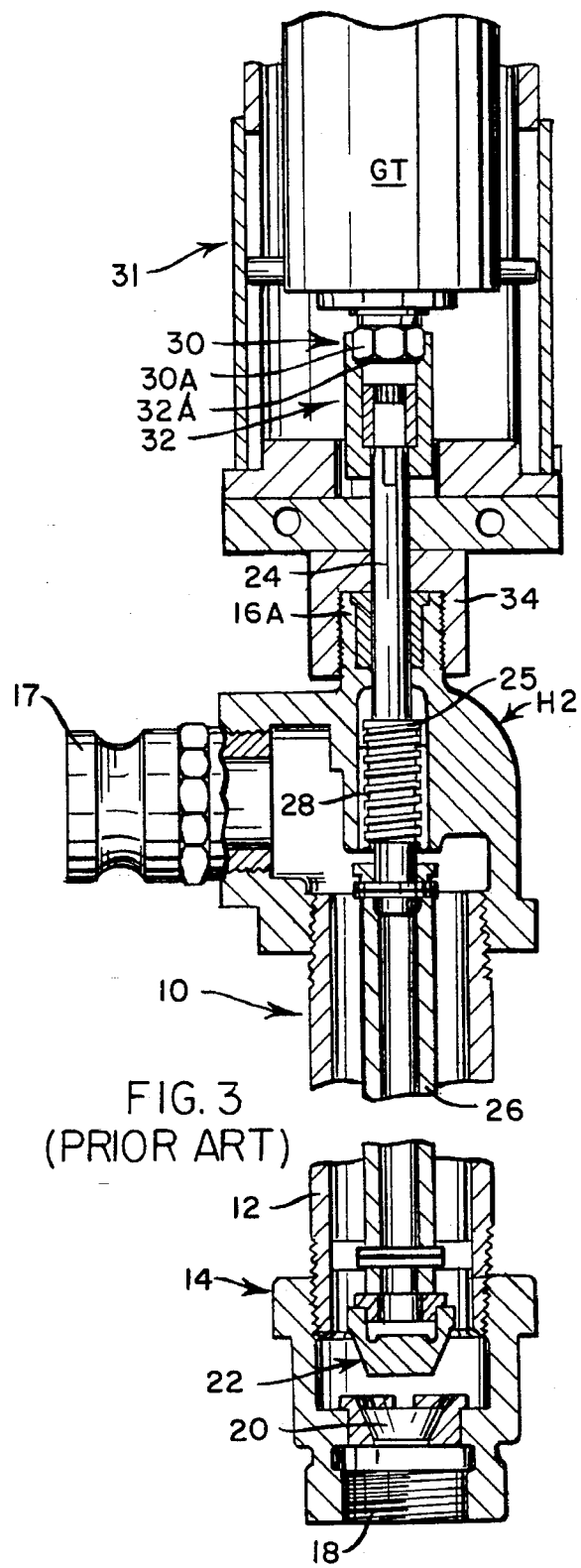
FIG. 2
(PRIOR ART)
FIG. 3
(PRIOR ART)

MOTORIZED WATER HYDRANT WITH MANUAL OVERRIDE

BACKGROUND OF THE INVENTION

1. Field of the Invention

The present invention relates to improvements in motorized water hydrants of the type used, for example, in automated snow-making systems for supplying a controlled flow rate of water to a snow gun or the like. More particularly, it relates to an apparatus by which such hydrants may be manually operated, for example, in the event of an electric power failure, or an insufficient motor torque to break loose a frozen or otherwise seized valve stem or the like.

2. Discussion of the Prior Art

In the commonly assigned U.S. Pat. No. 4,989,830, issued on Feb. 5, 1991 in the name of H. Ronald Ratnik, there is disclosed a motorized water hydrant in which the flow of water through the hydrant is controlled by an electric motor. The hydrant disclosed in this patent is intended for use in an automated snow-making system in which it is desirable to control the flow of water to a "snow-gun" from a remote location. The water flow rate through the hydrant is controlled by rotating a valve stem mounted in a threaded bushing on the hydrant. One end of the valve stem is operatively connected to a plug which is shaped to mate with a valve seat through which water can enter the hydrant housing. Rotational movement of the valve stem is translated by the threaded bushing to a movement of the plug towards or away from the vane seat, thereby adjusting the volume of water that can flow through the valve seat in a given time. The vane stem is rotatably driven by a bi-directional D.C. electric motor having a rotatably driven motor shaft which is operatively coupled to the valve stem via a gearing arrangement of high gear ratio (e.g. 300:1). The latter serves to convert the relatively high speed, low torque output of the motor to the slow speed, high torque output required for tightly closing and thereafter opening the hydrant.

In motorized hydrants and valves of the above type, provisions are often made for manually operating the valve when electric power to the motor fails. In some motor-controlled valves, provision is made for accessing the motor shaft directly so that the shaft may be gripped and rotated by a wrench or the like; in other motor-controlled valves, provision is made for entering the gear train at some level of reduction in order to manually rotate one of the gears. The former approach is disadvantageous when a high reduction gear train is used in combination with the motor because the operator must provide an excessive number of turns, say, 300 turns, to rotate the valve stem one revolution (as in the hydrant discussed above). The latter approach is disadvantageous in that it usually results in a complicated mechanism for rotating the gears; moreover, this approach is particularly difficult to accomplish when using epicyclic reduction units.

SUMMARY OF THE INVENTION

In view of the foregoing discussion, an object of this invention is to provide a simplified and low cost mechanism for overriding the motor input of a motorized water hydrant of the type described to enable the hydrant to be operated in the event of either electric power loss, or "seizing" of the valving mechanism to the extent that the normal torque provided from the electric motor input is insufficient to effect movement of the seized component, for example, a temporarily frozen valve stem.

The motorized hydrant of the invention generally features the combination of (a) means for rotatably mounting an entire motor assembly (which is normally used to rotate a valve stem and thereby adjust the hydrant flow rate) for movement about a vane stem axis, and (b) means for selectively locking up the motor drive shaft with respect to the motor assembly so that when the motor assembly (and its locked drive shaft) is manually rotated about the valve stem axis, the valve stem is rotated, resulting in the manual opening and closing of the hydrant.

According to a preferred embodiment of the invention, a motorized water hydrant comprises, as in the case of the prior art, a housing for receiving and containing water; a valve seat in the housing through which water can enter the housing; a plug adapted to cooperate with the valve seat to control the flow of water into the housing; a valve stem, operatively connected to the plug, for controlling the position of the plug relative to the valve seat, such valve stem having an end portion disposed outside the housing; and threaded means in the housing for rotatably supporting the valve stem and for converting rotational movement of the valve stem to axial movement of the valve stem, whereby the plug can be moved toward and away from the valve seat during rotational movement of the valve stem to control the flow rate of water into the housing. Also, as in the case of the prior art, selectively energizable bi-directional electric motor means are provided for rotatably driving the valve stem, such motor means including a rotatably-driven drive shaft having a first portion characterized by a substantially circular cross-section, and a second portion, axially spaced from said first portion and characterized by a non-circular cross-section. Coupling means are provided for coupling the drive shaft to the valve stem, whereby rotational movement of the drive shaft effects a rotational movement of said valve stem. In contrast with the hydrants of the prior art, however, a manual override means is provided which includes a handle member slidably mounted on the motor drive shaft and extending radially outward therefrom. Sliding movement of the handle on the drive shaft is effected by providing the handle member with a non-circular aperture which corresponds in shape and size to the non-circular cross-sectional shape and size of the motor drive shaft, and the handle member is arranged so that the motor drive shaft passes through the non-circular aperture in the handle. The handle member is movable axially along the motor shaft between a first position in which the handle aperture surrounds the first portion of the drive shaft while allowing the shaft to freely rotate therein, and a second position in which the handle aperture engages the second portion of the drive shaft and prevents rotation of the drive shaft relative to the motor assembly. Means are provided for rotatably mounting the motor assembly on the hydrant housing for movement about the valve stem axis. Thus, when the handle is moved to its second position and the motor assembly is rotated about the stem axis, the hydrant can be operated manually. Preferably, spring means are provided for biasing the handle towards its first position.

The invention and its various advantages will be better understood from the ensuing detailed description of preferred embodiments, reference being made to the accompanying drawings in which like reference characters denote like parts.

BRIEF DESCRIPTION OF THE DRAWINGS

FIGS. 2 and 3 are side and cross-sectional illustrations of a motorized water hydrant forming part of the prior art;

DETAILED DESCRIPTION OF A PREFERRED EMBODIMENT

Figure 1:
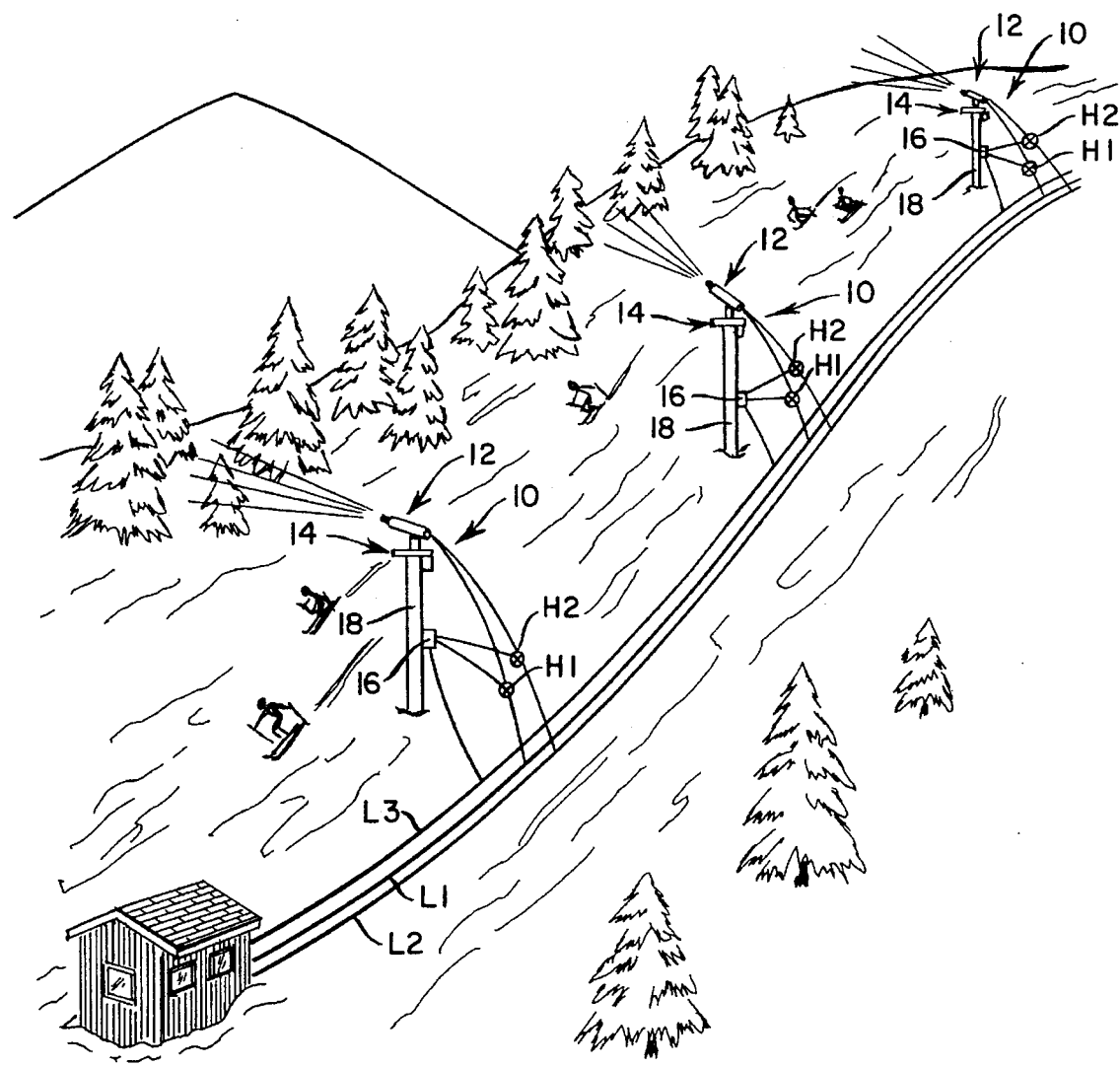
FIG. 1 is a diagrammatic illustration of an automated snow-making system of the type in which the invention is particularly useful.

Referring now to the drawings, FIG. 1 illustrates a snow-making system in which the motorized hydrant of the invention is particularly useful. Such a system typically comprises a plurality of snow-making sites 10 arranged at various locations along the ski trails of a ski resort. Each snow-making site comprises one or more snow-guns 12, each gun being mounted on a motor-controlled mount 14. Each snow gun may, for example, be of the type disclosed in the commonly assigned U.S. Pat. No. 3,829,013, issued to H. R. Ratnik. Such a gun operates, in a well known manner, to provide a spray of ice crystals (snow) upon combining water and compressed air under certain conditions which need not be explained here. It suffices to say that the consistency or "quality" of the snow produced by these devices is dependent, in large part, on the atmospheric conditions at the site, and the relative proportions of air and water supplied to each device. Water under high pressure and compressed air are supplied to each gun by water and compressed air lines L1 and L2, respectively. Electrical power is provided to each site via a power line L3. Motor-controlled hydrants H1 and H2 respectively control the flow of water and air supplied to the guns through line L1 and L2. When electric power is lost for any substantial time period, as sometimes occurs in the rugged terrain and severe weather conditions which are characteristic of ski areas, it is necessary to operate the hydrants manually.

Referring to FIGS. 2 and 3, the water hydrant H2 disclosed in U.S. Pat. No. 5,031,832 comprises a housing 10 which includes a steel riser pipe 12 to which a valve assembly 14 is threaded to its lower end. The valve assembly controls the flow of water into the hydrant housing. A bonnet 16 is threaded on the top of the riser pipe. The bonnet defines an outlet 17 through which water can flow out of the housing, for example, to the snow gun in the system of FIG. 1.

The valve seat assembly 14 comprises a threaded inlet 18 which communicates with a source of water. The threaded inlet defines a valve seat 20. The flow rate of water into the interior of housing 10 is controlled by a plug 22 which is rigidly connected to a valve stem 24 by an extension tube 26. The valve stem has a threaded portion 25 which is supported by a threaded bushing 28 which is press fit into a cylindrical bore formed in the interior of bonnet 16. Thus, as valve stem 24 rotates, it moves axially within the threaded bushing 28, thereby moving plug 22 toward or away from the valve seat, depending on the direction of stem rotation. Rotation of the valve stem is effected by a motor M which operates through a high reduction gear train GT to rotate a drive shaft 30 to which the top of the valve stem is connected. The motor and gear train are slidably mounted within a protective housing 31 which is connected to and supported by a threaded housing 34 which surrounds the valve stem and is threaded on a threaded fitting 16A integral with bonnet 16. A coupling member 32 has a hexagonal bore 32A therein which receives the hexagonally shaped end 30A of drive shaft 30. The opposite end of the coupling member is rigidly connected to the top of the valve stem.

In the water hydrant described above, it will be appreciated that no provision is made for accessing coupling 32 or drive shaft 30 for the purpose of manually rotating the valve stem and thereby manually operating the hydrant in the case of electric power failure or the like. Such a feature would be desirable not only from the power failure standpoint, but also from the standpoint that water hydrants of the type described, especially when used in sub-freezing temperatures, tend to freeze or seize up when left closed, or even in the same operating position, for prolonged periods of time. In such cases, exceedingly high torques are usually required to "crack" the seal (when closed) or to overcome the static friction. While the motor torque may be adequate to operate the hydrant under normal conditions, it may not be sufficiently powerful to provide the torque required when the valve stem is temporarily seized.

In accordance with the present invention, means are provided for overriding the action (if any) of the hydrant motor so that the hydrant can be manually operated when desired. As indicated above, the hydrant of the invention features manually operated means for selectively (a) locking up the motor drive shaft with respect to the motor assembly so that the motor assembly and drive shaft can be manually rotated as a unit with respect to the hydrant housing in order to rotate the valve stem in its threaded bushing in the hydrant housing and thereby manually open and close the hydrant, and (b) locking the motor assembly to the hydrant housing so that the motor drive shaft and the valve stem connected thereto can be rotated by the motor. The hydrant of the invention includes most of the components of the hydrant shown in FIGS. 2 and 3, including the hydrant housing 10, its bonnet 16, the valve stem 24, plug 22 and seat 20 arrangement, and the motor and reduction gearing components. Of course, significant changes have been made to provide the manual override feature, and these changes are best described with reference to FIGS. 4–7.

Figure 5:
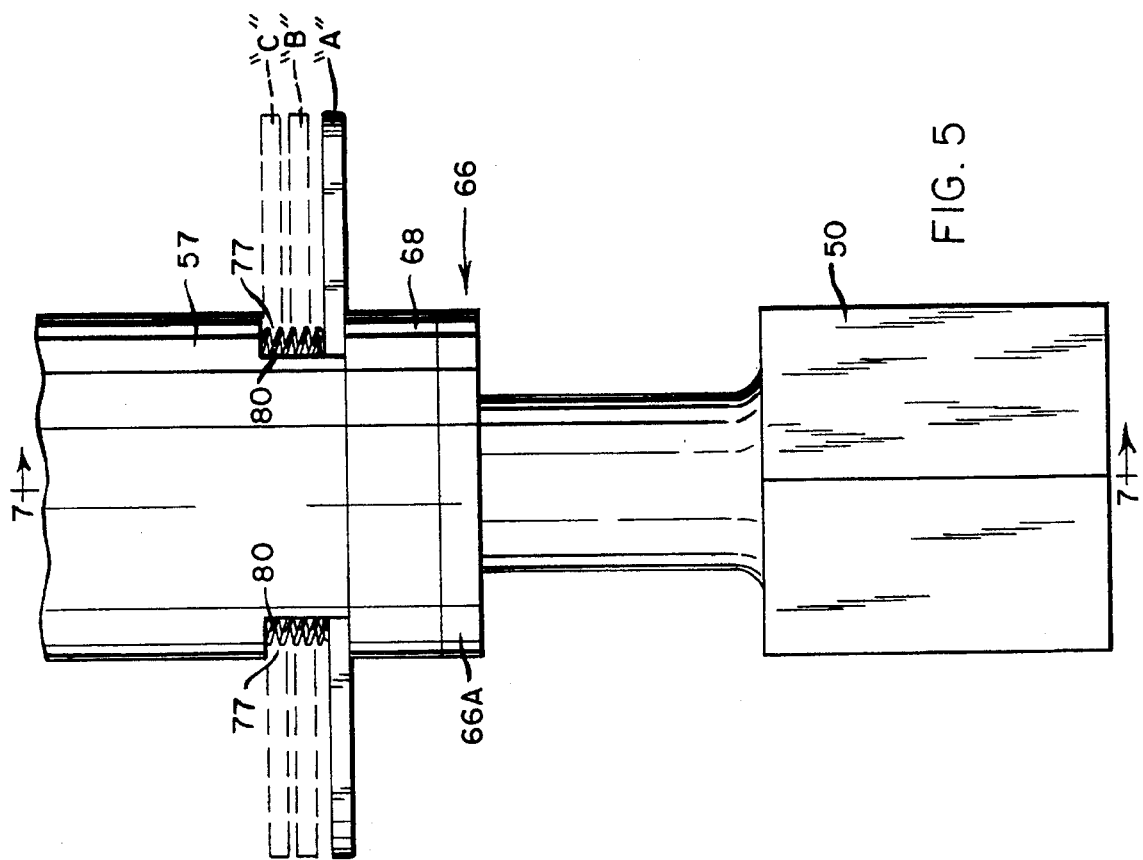
FIGS. 4 and 5 are side and front views of the motorized portion of a water hydrant embodying the present invention.
Figure 4:
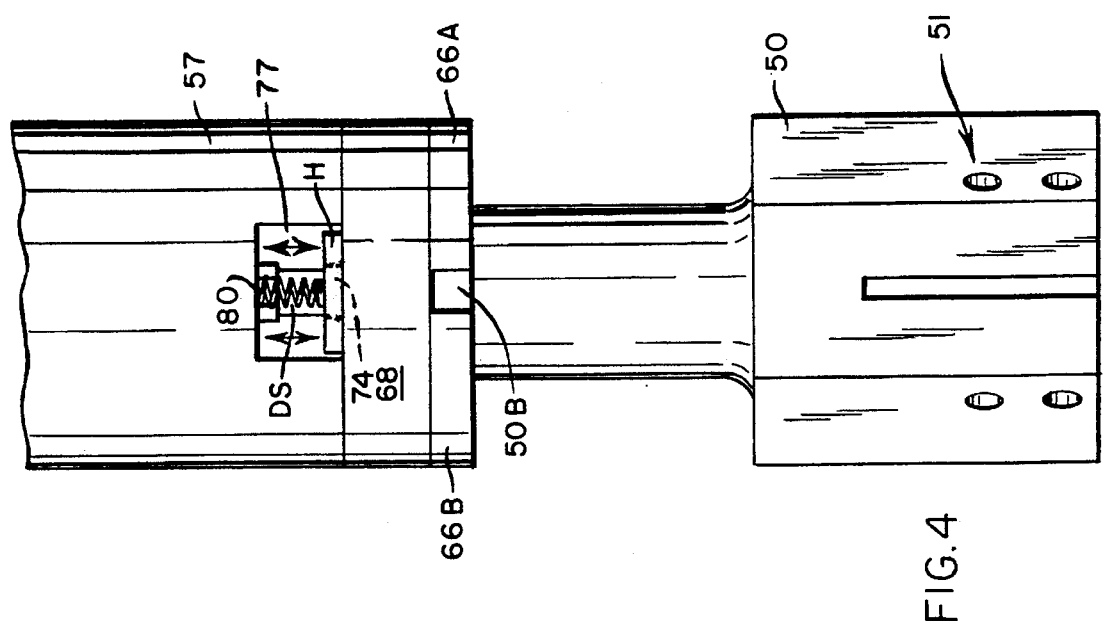
Figure 6:
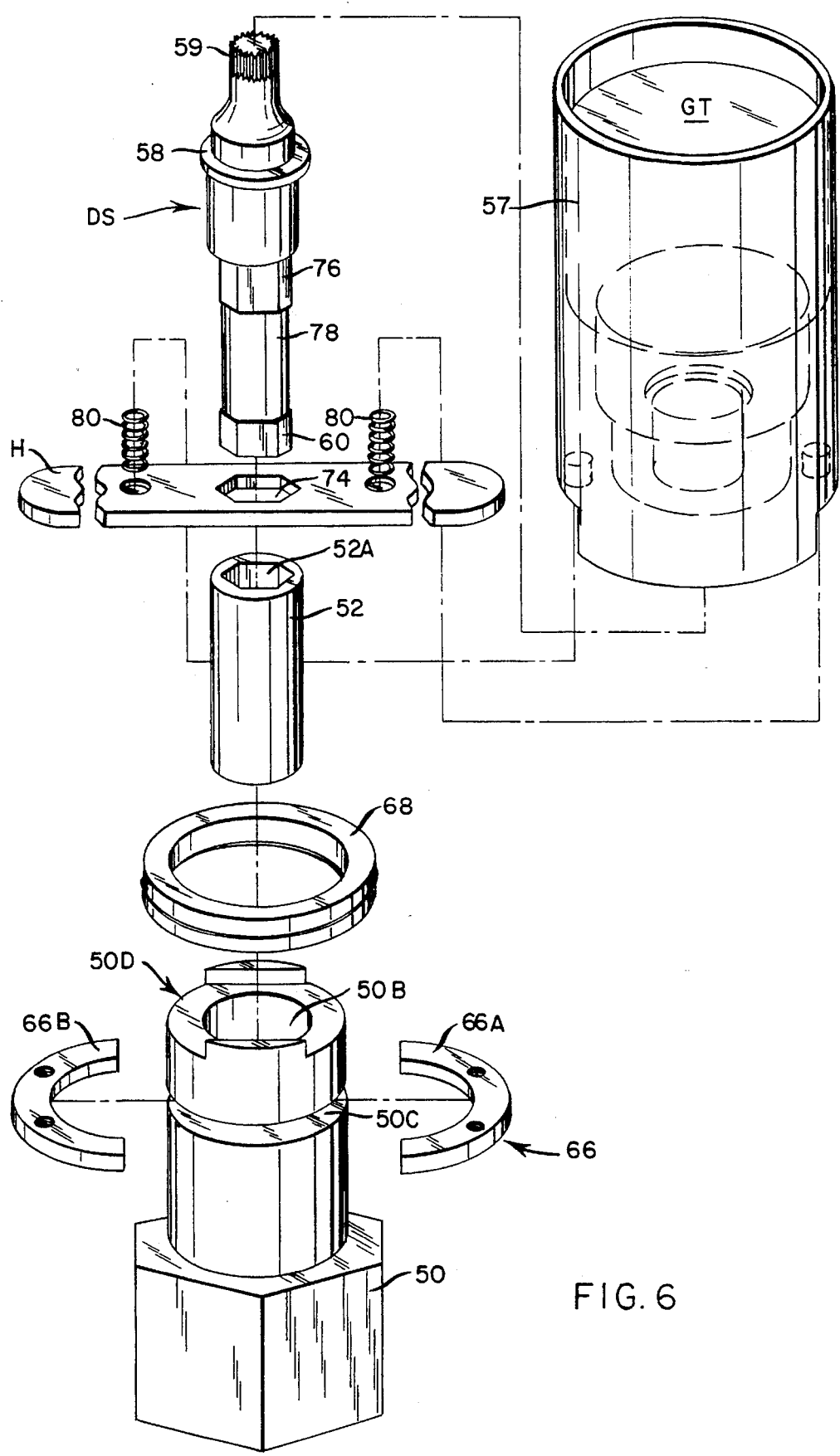
FIG. 6 is an exploded view of a portion of the hydrant of the invention.
Figure 7:
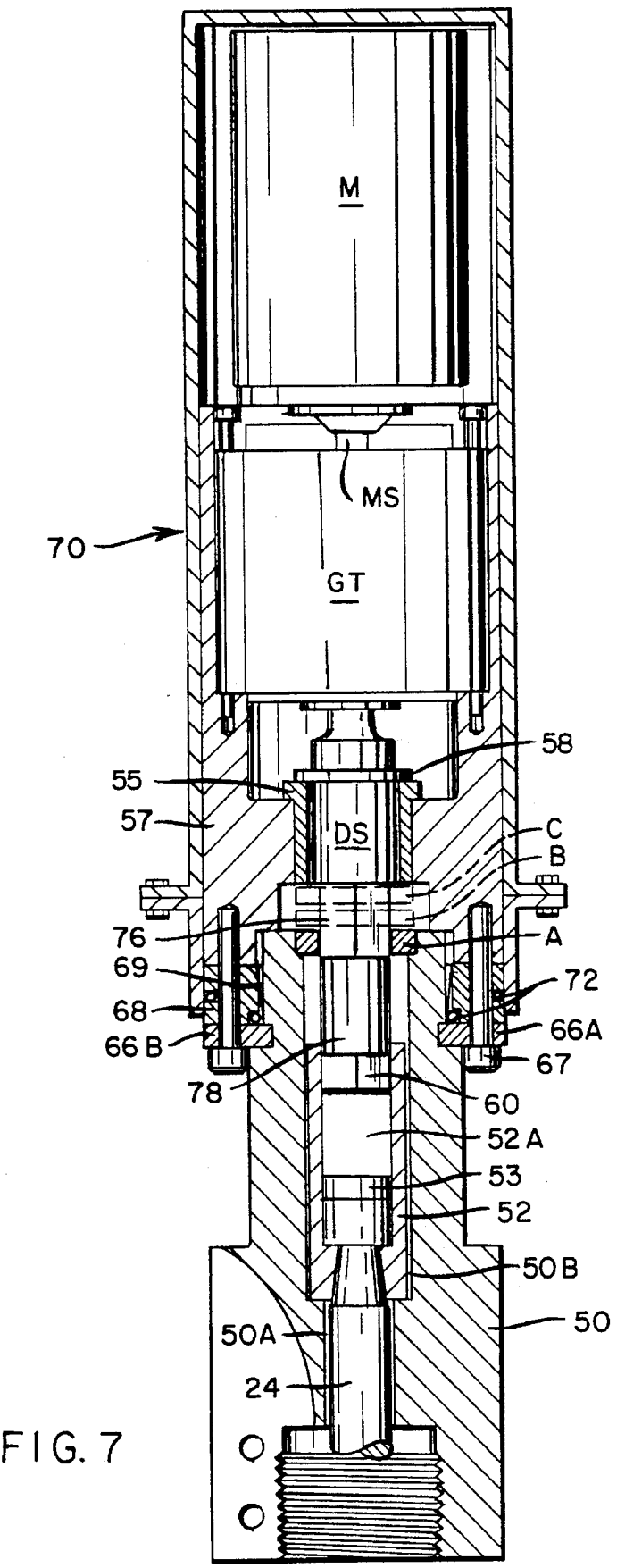
FIG. 7 is a cross-sectional view of the motorized portion of the hydrant of the invention, such view being taken along the section line 7—7 in FIG. 5.

Referring to FIGS. 4–7 and particularly to the cross-sectional view of FIG. 7, the hydrant of the invention comprises a threaded housing 50 which screws onto the threaded fitting 16A of the bonnet 16 of the hydrant shown in FIG. 3. Housing 50 has a narrow central bore 50A for receiving the hydrant's valve stem 24, and a wider central bore 50B for receiving a cylindrical coupling member 52 which serves to couple the valve stem to the drive shaft DS of the motor assembly. As shown in FIG. 4, housing 50 is slotted in the threaded region and is provided with a screw clamp 51 for securing the housing to the bonnet fitting 16A. The coupling member supports an Allen nut 53 or the like at the base of a deep hexagonal socket 52A formed in the coupling member. The Allen nut engages threads on the distal end of the valve stem and establishes a fixed relationship between the coupling member and the valve stem. Thus, as the valve stem rotates and thereby moves axially in housing 50, the coupling member also move axially.

As in the motorized hydrant discussed above with reference to FIG. 3, the motor assembly of the hydrant of the invention preferably includes a bi-directional D.C. electric motor M whose motor shaft MS is coupled to the motor assembly's drive shaft DS through a gear train GT of high gear ratio (e.g. 300:1) which serves to reduce the rotational speed of the motor shaft by a factor of about 300. The drive shaft is rotatably supported in a bearing 55 located in the base a gear housing 57 which contains the gear train. A flange 58 integral with the drive shaft locates the drive shaft with respect to the bearing. One end 59 of the drive shaft is shaped to be driven by the output of the gear train, while the distal end 60 of the drive shaft is provided with a hexagonal cross-section (best shown in the exploded view of FIG. 6) which is adapted to engage the deep hex socket 52A formed in the coupling member 52 so that the coupling member and the valve stem connected thereto rotates as the drive shaft rotates. The depth of socket 52A is sufficient to accommodate the axial movement of the valve stem as it rotates to open and close the valve seat 20.

The motor assembly, including the motor, gear train, gear train housing 57 and the drive shaft, is rotatably supported atop the valve stem housing 50 by the combination of a split ring assembly 66 and a split bearing 69. The split ring assembly comprises a pair of semi-circular members 66A and 66B which are adapted to be seated in a circular slot 50C formed in the circumference of housing 50. Members 66A and 66B are provided with mounting holes by which the split bearing may be attached to the gear housing by bolts 67. As best shown in the cross-sectional view of FIG. 7, the split bearing is connected to the gear housing via an intermediate sealing ring 68. Rotational movement of the gear housing about the valve stem housing is facilitated by the split bearing which, as shown in FIG. 7 is positioned between the inside surface of the sealing ring 68 and the outer wall of the valve stem housing 50. A protective housing 70 surrounds the entire motor assembly, and a pair of O-rings 72 prevent moisture from entering the assembly.

Manual operation of the hydrant described above is provided by a handle member H which, as explained below, is slidably mounted on the drive shaft and extends radially outward from opposite sides of the drive shaft through a pair of openings 77 (shown in FIG. 5) defined by notches formed in the gear housing and the top of sealing ring 68, and through slotted apertures formed in the protective housing 70. Sliding movement of the handle on the drive shaft is achieved by providing the handle with a hexagonally shaped opening 74 which is large enough to accommodate the drive shaft. As best shown in FIG. 6, the drive shaft DS further includes a second region 76 of hexagonal cross-section which is axially spaced from the hexagonally shaped end 60 by an elongated intermediate region 78 of circular cross-section. The hexagonal opening 74 in the handle has a size and shape adapted to engage the hexagonally shaped region 76 of the drive shaft. As shown in FIGS. 5 and 7, the handle member is free to slide along the drive shaft from a position "A" in which the handle opening 74 surrounds the shaft's cylindrical region 78, to a position "C" in which the opening 74 drivingly engages the shaft's hexagonal region 76. A pair of coil springs 80 positioned between the top of the handle member and the base of the gear housing (in the notched region) serve to urge the handle member toward position "A" where the handle does not interfere with the rotational movement of the drive shaft by the motor. When located in position "A", the handle member engages a slot 50D formed in the top surface of valve stem housing 50. In this position, the motor assembly is locked to the hydrant housing and thereby prevented from rotating relative to the hydrant housing. The operation of the hydrant is described below.

In operation, when the handle member is located at position "A" along the drive shaft DS (surrounding the region of circular cross-section and closest to the top of the valve stem housing 50), the handle member engages the slot 50D formed in the top surface of the valve-stem housing 50. This is the normal position for handle H, and the position towards which the handle is always urged by the coil springs 80. In this position, the motor assembly is locked to the valve stem housing, and the drive shaft and valve stem can freely rotate together inside the motor assembly. Note, since handle H projects outwardly through and beyond the openings in the gear housing 57 and protective housing 70, these housings cannot rotate relative to the valve stem housing which, as noted, is now rigidly position relative to the handle by virtue of the handle being located in slot 50D.

When handle H is manually raised, against the force of the coils springs 43, to the intermediate position "B" along the drive shaft, the hexagonal handle aperture still surrounds the cylindrical portion of the drive shaft and allows the drive shaft to rotate therein. At this location, however, the handle is released from the slot atop the valve stem housing, thereby de-coupling the gear and motor housings from the valve stem housing. Thus, at this location, the motor assembly can be manually rotated relative to the valve stem housing 50 by rotating the handle about the drive shaft axis. This intermediate location is necessary because, in attempting to raise the handle member to its shaft-engaging position "C", the hexagonal opening in the handle member does not usually align perfectly with the hexagonal portion 76 of the motor shaft. When the handle is manually rotated, the drive shaft is "back-driven" relative to the motor and alignment between the hexagonal parts 74 and 76 is readily achieved, and the handle can now be moved axially to position "C".

In position "C", the handle member operates to rigidly connect (lock) the drive shaft to its motor, preventing relative movement between these two components. Thus, when the handle is manually rotated about the drive shaft axis, the entire motor assembly, including the motor, gear box, and drive shaft, rotates as a unit about this axis. Owing to the rigid coupling C between the drive shaft and valve stem, the valve stem will be rotated by rotating the handle, and the hydrant can be manually operated.

The invention has been described with reference to a particularly preferred embodiment. It will be appreciated that various changes and modifications can be made without departing from the spirit of the invention. For example, the "hexagonal" elements 74 and 76 could easily have different shapes (e.g. rectangular, pentagonal, oval or trochoidal) so long as they cooperate to rotate the drive shaft when engaged and allow the shaft to rotate freely when disengaged. Similar changes will suggest themselves to skilled artisans, and such variations are intended to fall within the scope of the appended claims.

What is claimed is:

1. In a motorized water hydrant comprising a housing adapted to receive and contain water; means defining a valve seat in said housing through which water can enter said housing; means defining an outlet in said housing through which water within said housing can flow out of said housing; a plug adapted to cooperate with said valve seat to control the flow of water into said housing; a stem, operatively connected to said plug, for controlling the position of said plug relative to said valve seat, said valve stem having an end portion disposed outside said housing; threaded means in said housing for rotatably supporting said valve stem and for converting rotational movement of said valve stem to axial movement of said valve stem, whereby said plug can be moved toward and away from said valve seat during rotational movement of said valve stem to conrol the flow rate of water into said housing; selectively energizable bi-directional electric motor means for rotatably driving said valve stem, said motor means comprising a rotatably-driven drive shaft having a first portion characterized by a substantially circular cross-section, and a second portion, axially spaced from said first portion and characterized by a non-circular cross-section, and coupling means for coupling said drive shaft to said valve stem, whereby rotational movement of the drive shaft effects a rotational movement of said valve stem about its longitudinal axis, the improvement comprising:

manually operated means for selectively rotating said valve stem in the event of electric power loss, said manually operated means comprising a handle member operatively connected with said motor drive shaft and extending radially therefrom, said handle member having a non-circular aperture therein which corresponds in shape to the non-circular cross-sectional shape of said motor drive shaft, said handle member being arranged so that said motor drive shaft passes through said non-circular aperture in the handle, said handle member being movable axially along said motor shaft between a first position in which said handle aperture surrounds the first portion of the drive shaft while allowing said shaft to freely rotate therein, and a second position in which said handle aperture engages said second portion of the drive shaft and prevents said drive shaft from rotating relative said electric motor means, and means for rotatably mounting said electric motor means for movement about said valve stem axis, whereby said hydrant valve seat can be opened and closed by manually positioning said handle member in said second position and rotating said electric motor means about said valve stem axis.

2. The apparatus as defined by claim 1 wherein means are provided for biasing said handle toward said first position along said motor shaft.

3. The apparatus as defined by claim 2 wherein said biasing means comprises a plurality of coil springs.

4. The apparatus as defined by claim 1 wherein said handle has first and second portions extending radially from said drive shaft in opposite directions.

5. The apparatus as defined by claim 1 wherein said non-circular cross-section is polygonal in shape.

6. The apparatus as defined by claim 1 wherein said non-circular cross-section has a hexagonal shape.

7. The apparatus as defined by claim 1 wherein said hydrant housing is provided with a threaded fitting through which said stem projects to the exterior of said housing, and wherein an intermediate housing, rigidly connected to said threaded fitting, is provided for rotatably supporting said motor means relative to said hydrant housing, whereby said motor means and its drive shaft can be manually rotated about the longitudinal axis of said shaft when said handle member is moved axially along said shaft to said second position, and is thereafter manually rotated about said axis.

8. The apparatus as defined by claim 7 wherein said intermediate housing has a slot formed in the distal end thereof for receiving said handle member when said handle member is moved to its first position by a biasing means, whereby said motor means is prevented from rotating about said axis when said handle member is located in its first position.

9. The apparatus as defined by claim 1 further comprising a protective housing surrounding said motor means, said protective housing having a slot therein through which said handle member projects.

10. A motorized hydrant comprising (a) means for rotatably mounting an entire motor assembly which is normally used to rotate a valve stem and thereby adjust the hydrant flow rate for movement about the rotational axis of the valve stem, and (b) means for selectively locking up the motor drive shaft with respect to the motor assembly so that when the motor assembly and its locked drive shaft are manually rotated about the valve stem axis, the valve stem is rotated, resulting in the manual opening and closing of the hydrant.

11. In a motorized water hydrant having a valve stem rotatably mounted about an axis in a supporting housing which is selectively rotated by a rotatably driven drive shaft of an electric motor assembly to control the flow rate of the hydrant, the improvement comprising:

means for operating the hydrant in the event of electric power failure, said means comprising a handle member slidably mounted on the motor drive shaft for movement between a first position in which said drive shaft is free to rotate with respect to said handle, and a second position in which said handle, in cooperation with a housing associated with the motor assembly, prevents said drive shaft from rotating; and means for rotatably supporting said motor assembly for movement about said axis, whereby said hydrant can be manually operated when said handle is in said second position and said motor assembly is manually rotated about said axis.

12. The apparatus as defined by claim 11 wherein means are provided for biasing said handle toward said first position along said motor shaft.

13. The apparatus as defined by claim 12 wherein said biasing means comprises one or more coil springs.

14. The apparatus as defined by claim 11 wherein said handle has first and second portions extending radially from said drive shaft in opposite directions.

* * * * *